(No Model.)
2 Sheets—Sheet 1.
E. M. COLE.
SEED PLANTER.
No. 439,773.
Patented Nov. 4, 1890.
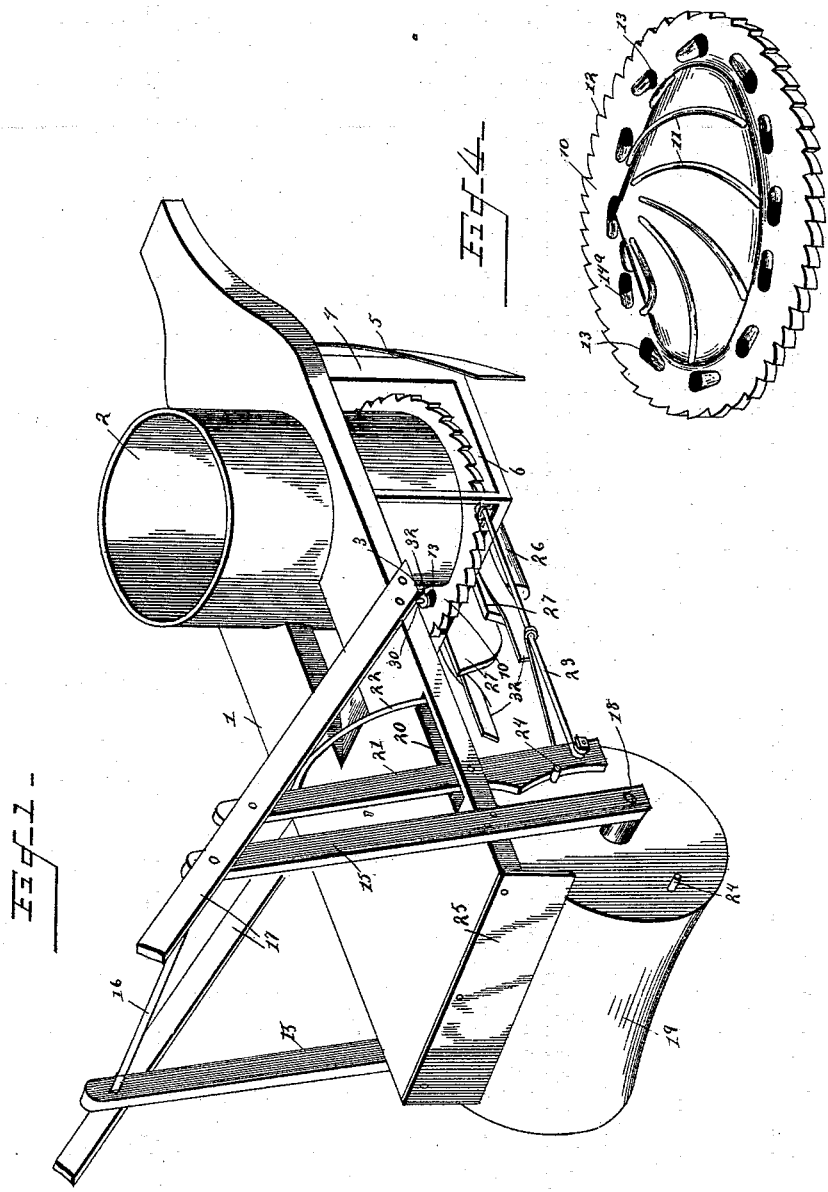
Witnesses
Geo. E. Freeh.
Wm. Bagger.
Inventor
Eugene M. Cole.
By his Attorneys,
C. A. Snow & Co.

(No Model.) 2 Sheets—Sheet 2.
E. M. COLE.
SEED PLANTER.
No. 439,773. Patented Nov. 4, 1890.
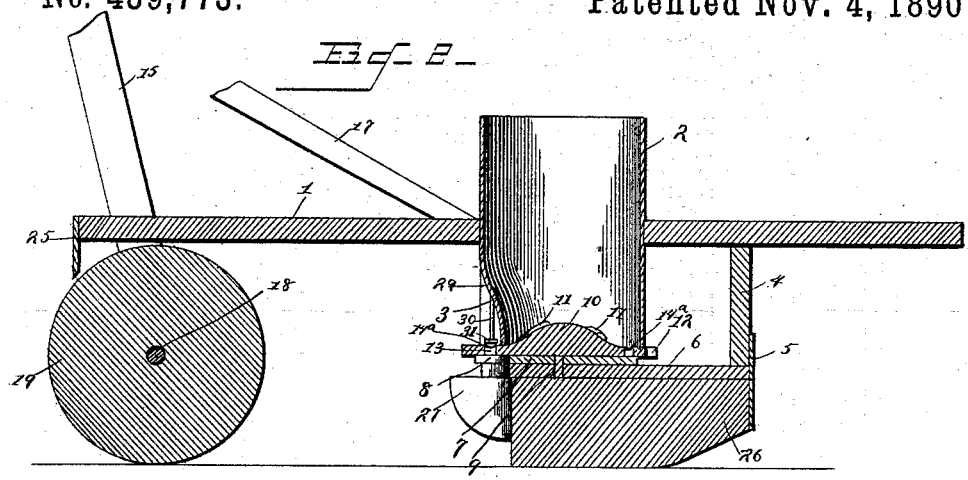
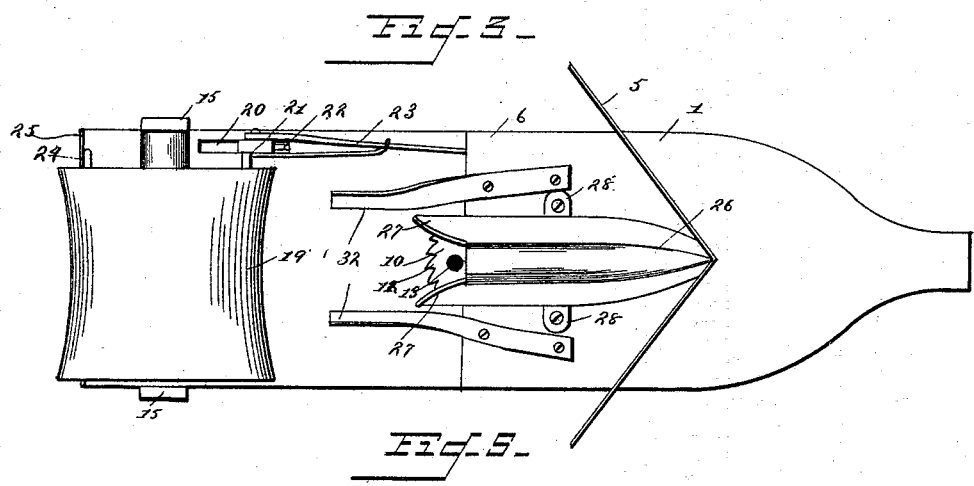
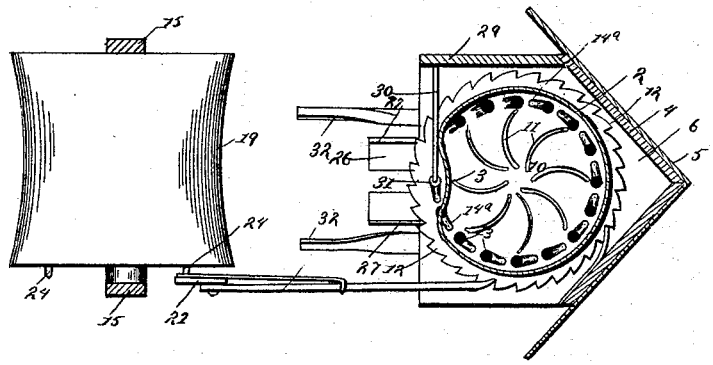
Witnesses
Geo. E. Frech.
Wm. Bagger.
Inventor
Eugene M. Cole.
By his Attorneys,
C. A. Snow & Co.

UNITED STATES PATENT OFFICE.

EUGENE MACON COLE, OF UNION CHURCH, NORTH CAROLINA.

SEED-PLANTER.

SPECIFICATION forming part of Letters Patent No. 439,773, dated November 4, 1890.

Application filed August 8, 1889. Serial No. 320,139. (No model.)

*To all whom it may concern:*

Be it known that I, EUGENE MACON COLE, a citizen of the United States, residing at Union Church, in the county of Moore and State of North Carolina, have invented a new and useful Seed-Planter, of which the following is a specification.

This invention relates to machines for planting cotton-seed, peas, and other seed; and it has for its object to provide a device which shall be simple in construction, durable, and easily operated.

With these ends in view the invention consists in the improved construction, arrangement, and combination of parts, which will be hereinafter fully described, and particularly pointed out in the claims.

In the drawings hereto annexed, Figure 1 is a perspective view of my improved planter. Fig. 2 is a longitudinal vertical sectional view. Fig. 3 is a bottom view. Fig. 4 is a perspective view of the seed-wheel detached. Fig. 5 is a sectional view taken horizontally through the hopper.

Like numerals of reference indicate like parts in all the figures.

1 designates the frame of the machine, in which is mounted the hopper 2. The latter consists of a cylindrical box, the lower end of which has an indentation 3 at its rear side. The front end of the frame has a downwardly-extending V-shaped bracket 4, the lower end of which carries a shield or scraper 5. Extending rearwardly from the lower end of the bracket 4 is a horizontal shelf 6, upon which is mounted a disk 7, the rear end of which has a notch 8.

The disk 7 is provided with a centrally-located boss 9, which supports the seed-wheel 10, which latter is journaled upon the disk 7. The seed-wheel consists of a circular disk, the upper side of which is conical and provided with a series of spirally-arranged ribs or flanges 11. The periphery of the seed-wheel is provided with teeth or ratchets 12, and the disk forming the said seed-wheel is provided with an annular series of vertical perforations 13, which constitute the seed-cups and adjacent to which recesses or depressions 14ª are formed, which serve to assist in guiding the contents of the hopper into the said seed-cups. The seed-wheel 10 is arranged directly below, and forms the bottom of the hopper 2, beyond the circumference of which the teeth or ratchets of the seed-wheel extend. The perforations forming the seed-cups are so located as to be within the hopper, except at the rear end of the latter, where it is provided with the indentation or cone 3. At this point it will be seen that the seed-cups pass outside the walls of the hopper.

The rear end of the frame is provided with standards 15, the upper ends of which are connected by a rung 16, to the ends of which the handles 17 are connected. The lower ends of the brackets 15 have bearings for the shaft 18, upon which is secured a roller 19, the periphery of which is concave, as shown, so that it will serve to compress the dirt about the seeds after the latter have been deposited in the ground. In a slot 20 in the frame 1, near the rear end of the latter, is mounted a lever 21, the upper end of which is pivoted to one of the handles 17, and which is forced in a rearward direction by means of a spring 22, attached to the said lever, extending into the slot 20 and bearing against the front end of the latter. Pivotally connected to the lower end of the lever 21 is a forwardly-extending dog or pawl 23, which engages the teeth or ratchets of the seed-wheel 10, thus imparting to the latter an intermittent rotary motion when the lever 21 is actuated. The end of the roller 19 adjacent to the lever 21 is provided with laterally-extending studs 24, which may be located any desired distance apart, according to the number of vibrations which the lever 21 is desired to make for each revolution of the roller.

To the rear end of the frame is attached a scraper 25, adapted to bear against the periphery of the roller for the purpose of removing from the latter any mud, clay, or other obstruction which adhere thereto.

To the under side of the bracket 6 is attached the furrow-opener 26, the rear end of which is provided with vertical wings or guard-plates 27, extending in rear of the said bracket. The furrow-opener is provided at its upper edge with laterally-extending perforated flanges 28 to receive the screws or bolts, by means of which it is secured to the under side of the bracket 6. The shelf or bracket 6 is connected with the frame of the machine by means of a vertical wall 29, to which is attached an elastic arm 30, the outer end of which is curved in a downward direction and provided with the ejector 31, adapted to fit within the vertical perforations or seed-cups in the seed-wheels. The under side of the said ejector is curved or convex, so that when the seed-wheel revolves it may readily slide out of the said seed-cups against the tension of the spring-arm to which it is attached. Suitably attached to the under side of the shelf or bracket 6 on each side of the furrow-opener are the covers 32, which serve to throw the dirt into the furrow after the seeds have been deposited therein.

From the foregoing description, taken in connection with the drawings hereto annexed, the operation and advantages of my invention will be readily understood.

By means of the lever and pawl hereinbefore described, an intermittent rotary motion is imparted to the seed-wheel. The seeds contained in the hopper are forced partly by their own weight and partly by the spiral ribs or flanges upon the upper conical side of the seed-wheel into the cups or perforations of the latter. As each seed-cup passes out at the indented rear side of the hopper, the superfluous seeds are brushed off by the edge of the hopper, and the contents of the seed-cup are forced out by means of the ejector and allowed to drop between the wings or flanges of the furrow-opener into the furrow prepared for their reception. As the machine progresses over the field, the furrow is filled by the coverers and the soil is compressed by means of the roller 19.

Having thus described my invention, what I claim, and desire to secure by Letters Patent, is—

1. In a seed-planter, the combination of the hopper having an indentation at its rear side, the seed-wheel forming the bottom of said hopper and having a conical upper side provided with spirally-arranged ribs or flanges, and an annular series of vertical perforations or seed-cups, recesses or depressions formed slantingly adjacent to the latter and provided at its periphery with teeth or ratchets, a pawl engaging the said teeth or ratchets, and suitable operating mechanism, substantially as set forth.

2. In a seed-planter, the herein-described seed-wheel having conical upper side provided with spirally-arranged ribs, an annular series of perforations or seed-cups, and recesses or depressions formed slantingly adjacent to said perforations or seed-cups, substantially as and for the purpose set forth.

In testimony that I claim the foregoing as my own I have hereto affixed my signature in presence of two witnesses.

EUGENE MACON COLE.

Witnesses:
M. McL. KELLY,
W. B. WODDELL.